UNITED STATES PATENT OFFICE.

ELIZA A. VANDERBEEK, OF PLAINFIELD, NEW JERSEY.

IMPROVEMENT IN MEDICAL COMPOUNDS.

Specification forming part of Letters Patent No. 150,446, dated May 5, 1874; application filed October 16, 1873.

*To all whom it may concern:*

Be it known that I, ELIZA A. VANDERBEEK, of Plainfield, in the county of Union and State of New Jersey, have invented a certain new and useful Medical Compound, called "Total Eclipse;" and I do hereby declare the following to be a full, clear, and exact description of the invention, such as will enable others skilled in the art to which it pertains to make and use it.

My invention relates to medicine; and consists in the compound of ingredients hereinafter set forth, to be used as a remedy for cholera, chronic diarrhea, dysentery, cholera morbus, cholera infantum, and all diseases of a similar nature which injuriously affect the digestive organs.

The compound consists of extract of logwood, sugar, (preferably loaf-sugar,) capsicum, oil of black pepper, brandy, and water, compounded in the following proportions, viz: Extract of logwood, one-quarter of a pound; sugar, two pounds; capsicum, one dram; oil of black pepper, one dram; brandy, one quart; water, four quarts.

The compound is prepared in the following manner. The extract of logwood is first dissolved in a sufficiency of boiling water. The sugar is then added to the dissolved extract, and stirred until dissolved therein. The mixture thus obtained is allowed to cool. When completely cooled the capsicum, oil of pepper, brandy, and enough water to make up the four quarts is then added, and the whole thoroughly agitated and allowed to settle. It is then bottled, corked, and sealed, and is ready for use.

What I claim is—

A medical compound, composed of the ingredients, and in proportion, substantially as herein set forth, for the purpose specified.

In testimony that I claim the foregoing, I have hereunto set my hand and seal this 15th day of September, 1873.

ELIZA A. VANDERBEEK. [L S.]

Witnesses:
 F. A. WHITE,
 A. HART.